United States Patent
Kawasaki et al.

(10) Patent No.: US 7,941,196 B2
(45) Date of Patent: May 10, 2011

(54) WATERPROOF STRUCTURE

(75) Inventors: Yasuhiko Kawasaki, Higashiyamato (JP); Takeru Baba, Ome (JP); Toshiyuki Murakami, Setagaya-ku (JP); Shigeru Kato, Ome (JP); Tsutomu Yamaguchi, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 608 days.

(21) Appl. No.: 11/900,228

(22) Filed: Sep. 10, 2007

(65) Prior Publication Data

US 2008/0081679 A1 Apr. 3, 2008

(30) Foreign Application Priority Data

Sep. 28, 2006 (JP) .................... 2006-264736
May 21, 2007 (JP) .................... 2007-134816
Jul. 19, 2007 (JP) .................... 2007-188606

(51) Int. Cl.
*H04M 1/00* (2006.01)
(52) U.S. Cl. ............... 455/575.8; 455/550.1; 455/575.1; 379/428.01; 379/433.01; 379/437
(58) Field of Classification Search ............... 455/575.8, 455/550.1, 575.1, 90.3; 379/428.01, 433.01, 379/437
See application file for complete search history.

(56) References Cited

U.S. PATENT DOCUMENTS 5,045,971 A * 9/1991 Ono et al. .................. 361/704
6,942,153 B1 * 9/2005 Yuan et al. ............... 235/472.01
2004/0014506 A1 * 1/2004 Kemppinen ............... 455/575.1
2004/0029530 A1 * 2/2004 Noguchi et al. ............ 455/23
2004/0195783 A1 * 10/2004 Akagi et al. ................ 277/645

FOREIGN PATENT DOCUMENTS

| JP | 59-72239 U | 5/1984 |
|---|---|---|
| JP | 02-89887 U | 7/1990 |
| JP | 05-47815 U | 6/1993 |
| JP | 06-56932 U | 8/1994 |
| JP | 09-008474 | 1/1997 |
| JP | 11-288635 | 10/1999 |
| JP | 2000-048786 | 2/2000 |
| JP | 2001-036262 | 2/2001 |
| JP | 2001-339176 | 12/2001 |
| JP | 2002-252478 | 9/2002 |
| JP | 2003-069275 | 3/2003 |
| JP | 2003-322556 | 11/2003 |
| JP | 2004-312621 | 11/2004 |
| JP | 2005-340682 | 12/2005 |
| JP | 2006-162789 | 2/2006 |
| JP | 2006-106428 | 4/2006 |

* cited by examiner

*Primary Examiner* — Raymond S Dean
(74) *Attorney, Agent, or Firm* — Cohen Pontani Lieberman & Pavane LLP

(57) ABSTRACT

A waterproof structure for a casing has a first casing, a second casing to be put together with the first casing, and a waterproof member formed of an elastic material to prevent water from penetrating between the first casing and the second casing. The second casing has a recess. The waterproof member has a peripheral part which, when fitted into the recess, prevents penetration of water. The peripheral part is provided at the periphery of the waterproof member, which is laid out all around space between the first casing and the second casing. A projection engages with a dent. A restriction part of the first casing, provided at a position facing the peripheral part and protruding toward the second casing, prevents the peripheral part from coming out.

15 Claims, 10 Drawing Sheets

WATERPROOF STRUCTURE

BACKGROUND OF THE INVENTION

1. Field of the Invention

The present invention relates to a waterproof structure of a casing of a portable electronic device or the like.

2. Description of the Related Art

There are waterproof structures for a portable transmitter each of which holds a peripheral end portion of a waterproof cover between two separate cases, as described in Unexamined Japanese Patent Application KOKAI Publication Nos. H11-288635 and 2004-312621.

There is also a waterproof structure for a weighing machine in which an end portion of a waterproof diaphragm is press fitted in a recessed groove provided at a case, as described in Unexamined Japanese Patent Application KOKAI Publication No. 2003-322556.

If the end portion of the waterproof cover is held by the separate two cases from above and bottom, however, elastic force acts in the vertical (up and down) direction. It is therefore necessary to provide a lot of screws or a lot of hook parts to fix the separate cases.

The end portion of the waterproof diaphragm, if merely press fitted in the recessed groove provided at the case, may come out due to vibration or the like. This impairs the waterproofing capability.

SUMMARY OF THE INVENTION

Accordingly, to overcome the problem, it is an object of the present invention to provide a waterproof structure which makes it harder for water to penetrate inside casings. Specifically, it is an object of the present invention to provide a waterproof structure which can easily fix separate casings with fewer screws, and prevent a waterproof member from coming out due to vibration or the like, making it harder for water to penetrate inside the casings.

To achieve the object, a waterproof structure for a casing according to the present invention comprises:

a first casing;

a second casing to be put together with the first casing;

a waterproof member formed of an elastic material to prevent water from penetrating between the first casing and the second casing, the second casing having a recess with a dent in which a projection is insertable, the waterproof member having a protruding seal part which, when fitted into the recess, prevents penetration of water and has a projection engageable with the dent when being inserted in the dent.

BRIEF DESCRIPTION OF THE DRAWINGS

These objects and other objects and advantages of the present invention will become more apparent upon reading of the following description and the accompanying drawings in which.

DETAILED DESCRIPTION OF THE PREFERRED EMBODIMENTS

First Embodiment

An embodiment of the present invention will now be described with reference to the accompanying drawings.

Figure 1:
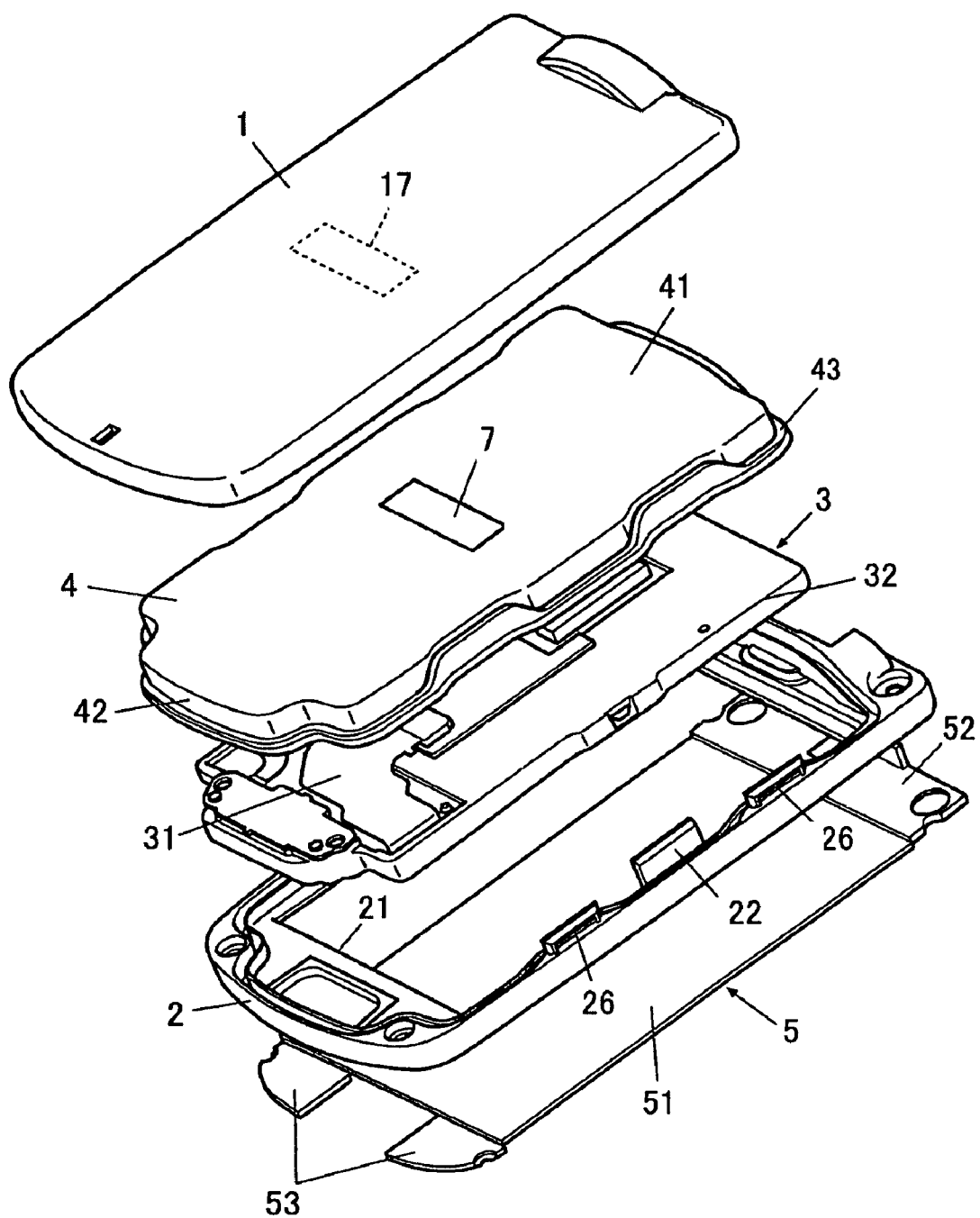
FIG. 1 is an exploded perspective view of a first casing, a second casing, a waterproof member, etc. illustrating a structure according to a first embodiment of the invention.

As shown in FIG. 1, a waterproof structure according to the embodiment has a first casing 1, a second casing 2, an interior trim 3, a waterproof member 4 and an exterior trim 5.

In the embodiment, the waterproof structure is adapted to the first casing 1 and the second casing 2 which constitute the display side body of a fold type cellular phone. The interior trim 3 that is to be accommodated between the first casing 1 and the second casing 2 comprises a liquid crystal display (LCD) panel 31 and a shield case 32 thereof. The waterproof member 4 is a film-like rubber packing. As the material for the waterproof member 4, polybutadiene, polyacrylonitrile or the like can be used. The exterior trim 5 has a hinge piece 52 at one end side of a transparent panel 51 and a pair of screw screens 53 at the other side of the transparent panel 51.

The display side body is coupled to an operation side body (not shown) via a 2-shaft hinge part. The 2-shaft hinge part can provide a state (use state) where the display side body is opened to the operation side body around a first hinge shaft, a folded state (non-use state) where the display side body is closed over the operation side body around a first hinge shaft, and a folded state (state where camera shooting or television viewing can be done) where the display side body is rotated by 180 degrees around the second hinge shaft so that the display section comes on the front side.

Specifically, the first casing 1 and the second casing 2 accommodate the interior trim 3, such as the LCD panel 31 and the shield case 32, and are coupled together by screws (not shown) at four corners.

The exterior trim 5 is mounted on the outer surface of the second casing 2. That is, the transparent panel 51 is adhered around an opening 21 where the display screen of the LCD panel 31 is located by a double-sided tape 6 (see FIG. 4) in the outer surface of the second casing 2. The hinge piece 52 on one end side of the transparent panel 51 and the pair of screw screens 53 on the other side are likewise adhered to the second casing 2 by a double-sided tape (not shown). This provides a waterproof state.

Figure 2:
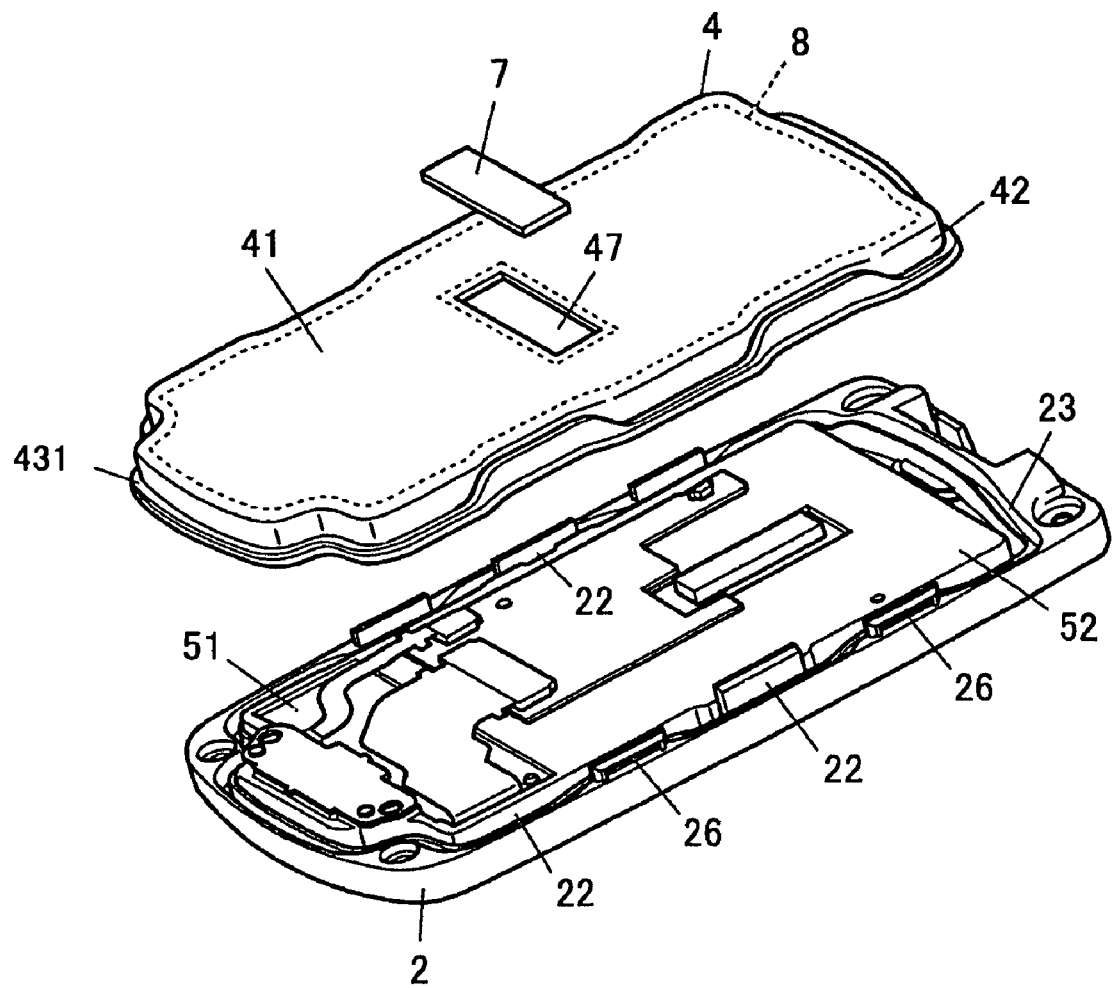
FIG. 2 is an exploded perspective view showing an interior trim installed in the second casing shown in FIG. 1, together with the waterproof member.

As shown in FIGS. 1 and 2, the waterproof member 4 has a flat part 41 and a circumferential wall part 42, which cover the interior trim 3, such as the LCD panel 31 and the shield case 32, and a peripheral part 431 protruding in parallel in a flange shape from the outer surface of the circumferential wall part 42.

As shown in FIG. 2, a recessed transparent mount part 47 is formed nearly at the center of the outer surface of the flat part 41 of the waterproof member 4. A light guide plate 7 is insert-molded at the transparent mount part 47. The waterproof member 4 is made of transparent rubber. If the LCD panel 31 has a high definition, inserting the light guide plate 7 in nearly the center of the flat part 41 can provide a easy-to-see display. Therefore, the light guide plate 7 is set on the outer surface side of a mold to be insert-molded at the time of molding the waterproof member 4.

As the light guide plate 7 is integrally formed at the flat part 41 of the waterproof member 4 by insert molding, the number of waterproof locations can be reduced as compared with a case where an opening is provided in the waterproof member 4 and a light guide plate is installed there. It is also possible to reduce the thickness of waterproofing portions and the number of parts and ensure a stable waterproof capability.

An electromagnetic shield 8 is formed on nearly the entire inner surface of the flat part 41 of the waterproof member 4. The electromagnetic shield 8 is formed by insert-molding a silver sheet (or metal plate) 8 set on the inner surface side of the flat part 41 in the mold at the time of molding.

Entirely forming the electromagnetic shield 8 by insert-molding the silver sheet (or metal plate) 8 on the inner surface side of the flat part 41 of the waterproof member 4 can eliminate a step such as silver deposition which is conventionally performed on the inner surface of the first casing 1.

Figure 3:
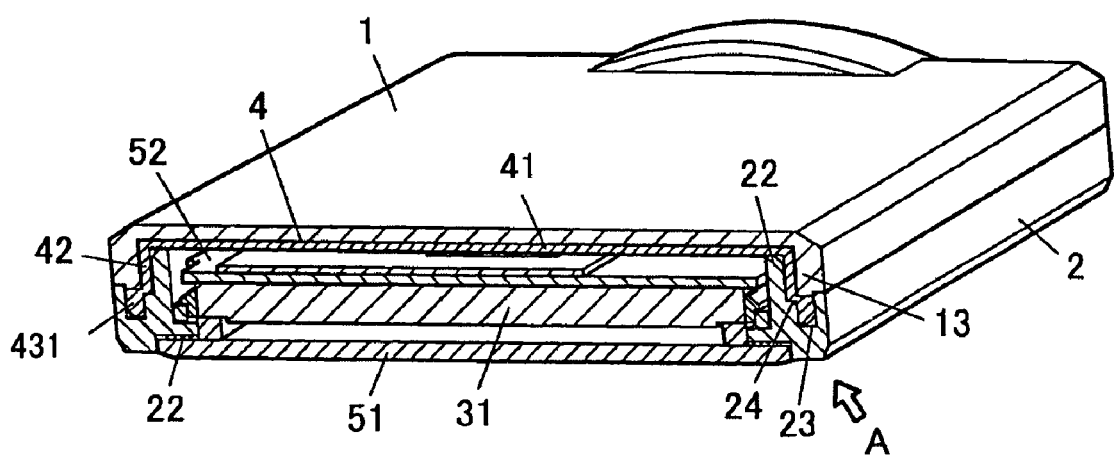
FIG. 3 is a partly broken-away perspective view showing the waterproof member and the like installed in the first casing and the second casing.
Figure 4:
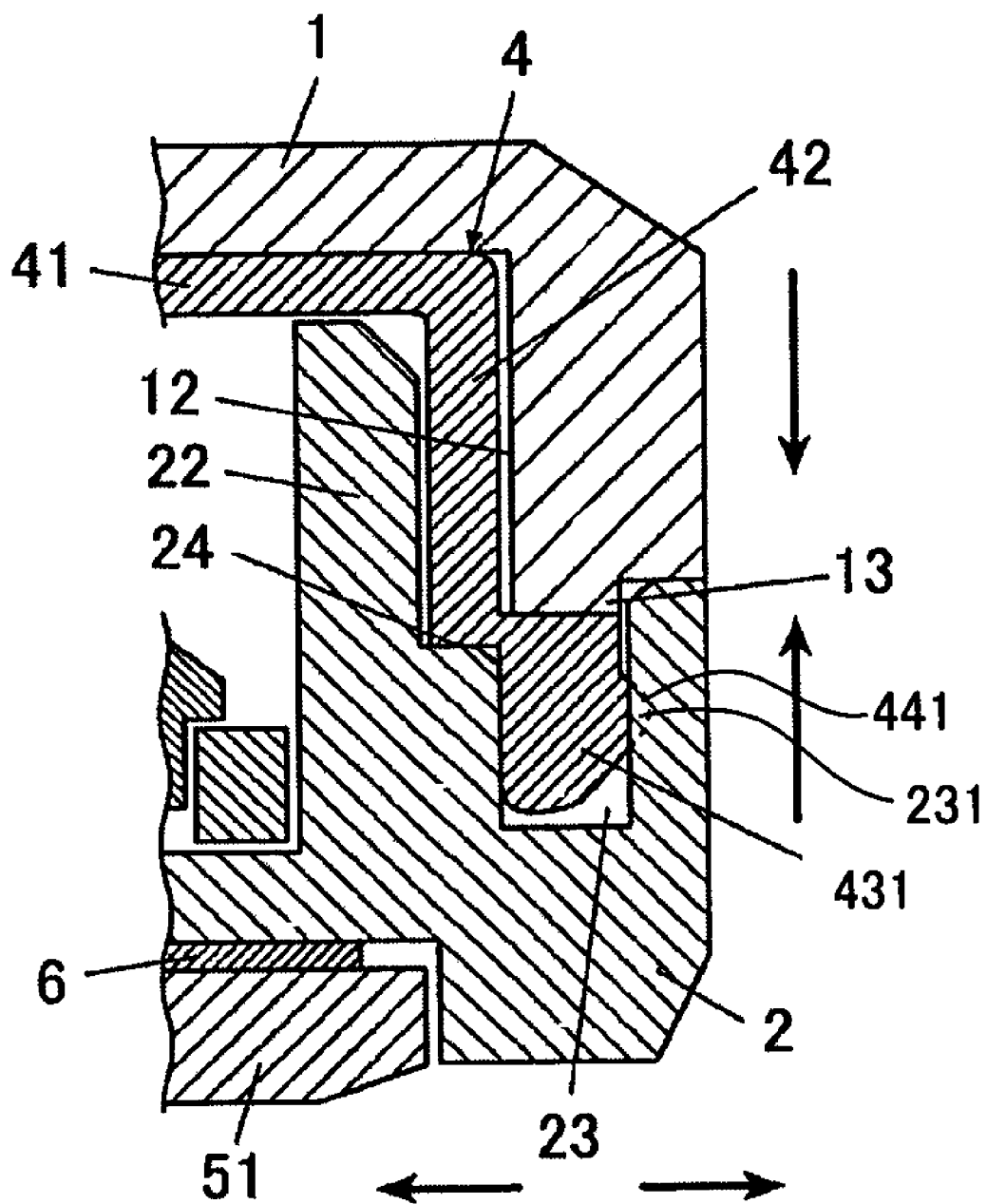
FIG. 4 is an enlarged cross-sectional view of a part indicated by an arrow A in FIG. 3.

As shown in FIGS. 3 and 4, a recess 23 in which the peripheral part 431 of the waterproof member 4 is press fitted is formed all around the second casing 2. Likewise, a planar support 24 which supports an end face of the circumferential wall part 42 of the waterproof member 4 is formed all around the second casing 2. Of right and left projecting parts that form the recess 23, the inner projecting parts are guide parts 22. The guide parts 22 project toward the first casing 1. A pair of engage claws 26 positioned on the outer surface side of the recess 23 is protrusively formed on the right and left side portions of the second casing 2.

As shown in FIG. 4, the recess 23 has a dent 231 inside where a projection can be inserted in the inner surface of the recess 23. The peripheral part 431 has a projection 441 engageable with the dent 231. The engagement of the projection 441 with the dent 231 prevents the peripheral part 431 from coming out of the recess 23.

An internal part 12 is formed all around the first casing 1. A restriction part 13 which prevents the peripheral part 431 from coming out is formed at a position of the end face of the internal part 12 which abuts on the peripheral part 431.

An illumination part 17 showing a logo or the like is formed over the light guide plate 7 of the waterproof member 4 at nearly the center of the first casing 1.

A pair of engage claws (not shown), which respectively engage with the engage claws 26 of the second casing 2, project from the right and left side portions of the first casing 1.

A description will now be given of how to connect the first casing 1 and the second casing 2 together.

First, the waterproof member 4 is mounted inside the second casing 2 retaining the interior trim 3, such as the LCD panel 31 and the shield case 32. That is, the flat part 41 of the waterproof member 4 is placed over the interior trim 3. Both side portions of the circumferential wall part 42 are placed over the guide parts 22 of the second casing 2, and placed inside the engage claws 26. The peripheral part 431 is press fitted in the recess 23 of the second casing 2.

Then, the second casing 2 and the waterproof member 4 are placed over the first casing 1. That is, the first casing 1 is placed over the flat part 41 of the waterproof member 4 to place the internal part 12 over the circumferential wall part 42 of the waterproof member 4, and the restriction part 13 of the first casing 1 is placed over the peripheral part 431 of the waterproof member 4. At this time, the pair of engage claws of the first casing 1 are engaged with the engage claws 26 of the second casing 2 at the right and left side portions of the second casing 2. Then, the first casing 1 and the second casing 2 are coupled together by screws (not shown) at four corners.

As shown in FIGS. 3 and 4, the circumferential wall part 42 bent inward from the peripheral part 431 of the waterproof member 4 and standing upright toward the first casing 1 is guided between the internal part 12 of the second casing 2 and the guide parts 22 at the right and left side portions of the first casing 1. Then, the peripheral part 431 of the waterproof member 4 is press fitted in the recess 23 of the second casing 2. The projection 441 of the peripheral part 431 is engaged with the dent 231 of the recess 23. Then, the peripheral part 431 is pressed by the restriction part 13 of the first casing 1 to be prevented from coming out. The end face of the circumferential wall part 42 of the waterproof member 4 is supported by the support 24 of the second casing 2. The flat part 41 of the waterproof member 4 is supported by the guide parts 22 at the right and left side portions of the second casing 2.

In the process of connecting the first casing 1 and the second casing 2, at the time of installing the waterproof member 4, the guide parts 22 of both side portions of the first casing 1 and the internal part 12 of the second casing 2 serve as a guide to facilitate the work.

The guide parts 22 of both side portions of the second casing 2 can prevent the circumferential wall part 42 of the waterproof member 4 from vibrating.

The support of the guide parts 22 at the right and left side portions of the second casing 2 can prevent the flat part 41 of the waterproof member 4 from rocking.

Elastic force does not act in the vertical (up and down) direction unlike in the conventional waterproof structure, so that repulsive force is not generated between the first casing 1 and second casing 2 to be fixed. Accordingly, the separate first casing 1 and second casing 2 are easily fixed by fewer screws or the like, like four screws, and engage claws or the like. As the waterproof member 4 is prevented from coming out, vibration or the like does not cause the waterproof member 4 to come off, thus ensuring reliable waterproofing.

Because the waterproof structure does not have elastic force acting in the vertical (up and down) direction and the first casing 1 and the second casing 2 need not have unnecessarily high rigidity, it is possible to reduce the thicknesses of the casings for a thinner and smaller cellular phone.

If the waterproof structure is configured so that the circumferential wall part 42 of the waterproof member 4 is not only guided but also held between the internal part 12 of the second casing 2 and the guide parts 22 at the right and left side portions of the first casing 1, the waterproof capability is further improved.

In the embodiment, a logo or the like can be displayed at the illumination part 17 at nearly the center of the first casing 1 by illuminated light from the light guide plate 7 of the waterproof member 4.

Second Embodiment

Figure 5:
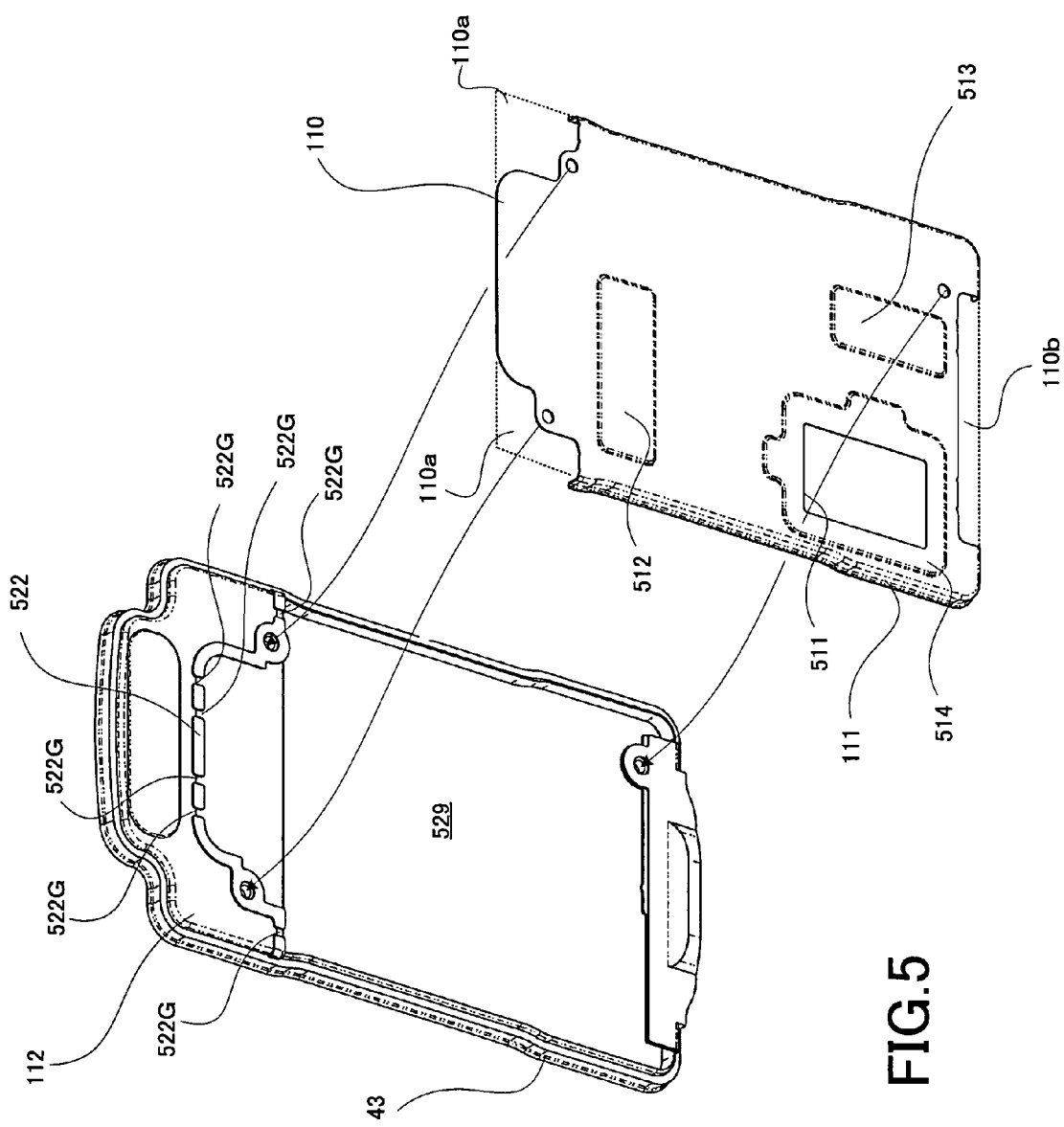
FIG. 5 is an exploded perspective view showing a sheet packing and a metal plate constituting a waterproof member of a waterproof structure according to a second embodiment of the invention.

FIG. 5 shows a waterproof structure according to the second embodiment of the present invention. The waterproof structure according to the second embodiment differs from that of the first embodiment in that the waterproof member 4 has a metal plate 110.

The metal plate 110 has an approximately rectangular shape as seen from the top, as shown in FIG. 5. It is to be noted that the upper two corners in FIG. 5 and a lower center portion in FIG. 5 of the rectangular shape are cut away. Accordingly, the metal plate 110 has cutaway portions 110a, 110a and a cutaway portion 110b at the above-specified locations.

To emphasize the presence of the cutaway portions (110a, 110b), FIG. 5 shows, by broken lines, the contour shapes in an assumed case where the cutaway portions are not present.

A window 511 having an approximately rectangular shape is formed in the metal plate 110 as indicated by the lower left portion in FIG. 5. The window 511 is formed in a forming region for a projection 514 which is formed on the metal plate 110 to provide a step.

Projections 512 and 513 similar to the projection 514 are also formed on the metal plate 110. The projections 512, 513 can be provided according to, for example, the layout or the like of various relatively thick elements which are included in an electric circuit board to be mounted in the casings. That is, the locations of the projections 512, 513 on the metal plate 110 can be set freely according to the layout or the like of the elements. (This is also applied to the projection 514.)

The presence of the projections 512 to 514 make the metal plate 110 stronger than a simple flat metal plate.

Figure 6:
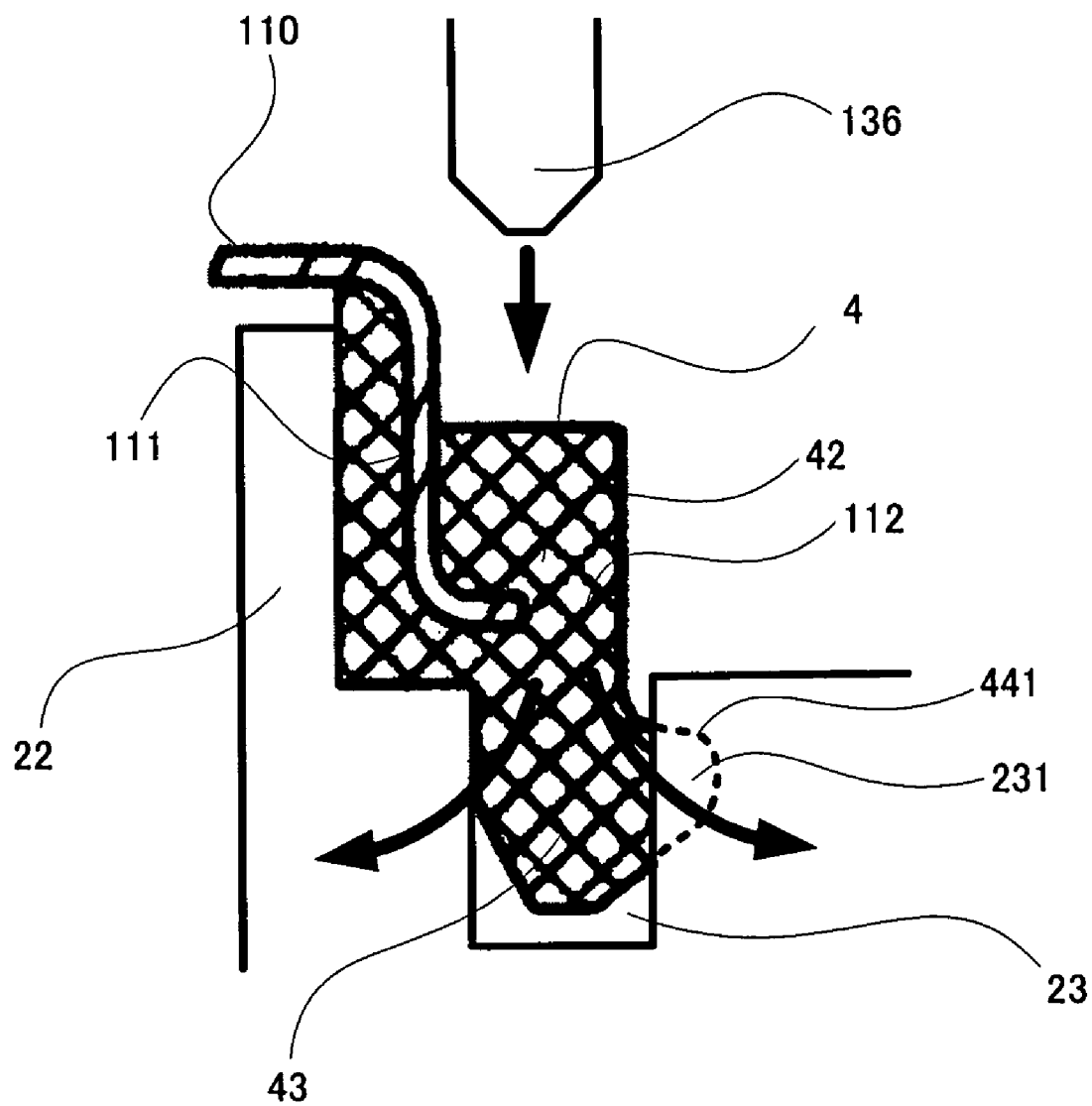
FIG. 6 is an explanatory diagram showing a state where a protruding seal part of the waterproof member is fitted in a recess of a second casing, and how force is applied to the protruding seal part by a sealing projection of a first casing.

The metal plate 110 further has engagement walls 111 at the right and left side edge portions as shown in FIGS. 5 and 6. The engagement walls 111 stand upright perpendicularly as seen from a flat portion of the metal plate 110 which occupies most of the metal plate 110. The engagement walls 111 are used at the time of making connection to a sheet packing 112. It is preferable that the metal plate 110 be formed of a rust-resistant metal such as stainless steel.

As shown in FIG. 5, the sheet packing 112 has an approximately rectangular shape larger than the outer shape of the metal plate 110 as seen from the top. More specifically, the widthwise (right and left direction in FIG. 5) length of the sheet packing 112 is nearly the same as that of the metal plate 110, while the length of the sheet packing 112 in the direction orthogonal to the widthwise direction is larger than that of the metal plate 110. The sheet packing 112 has an opening 529 where the metal plate 110 is arranged. The opening 529 is slightly smaller than the metal plate 110, and the peripheral portion of the metal plate 110 is connected to the peripheral portion of the opening 529 of the sheet packing 112.

The sheet packing 112 has a protruding seal part 43 provided so as to surround the contour of the sheet packing 112. With the metal plate 110 arranged at the opening 529, the protruding seal part 43 stands upright perpendicularly from the flat portion of the metal plate 110. The upright direction of the protruding seal part 43 is the same as the upright direction of the engagement walls 111 (see FIG. 6). The width of the middle portion of the protruding seal part 43 is wider than the width of the recess 23 (see FIG. 6). As shown in FIG. 6, the recess 23 has the dent 231 inside in which the projection can be inserted. The protruding seal part 43 has the projection 441 engageable with the dent 231. The engagement of the projection 441 with the dent 231 prevents the protruding seal part 43 from coming out of the recess 23. The protruding seal part 43 primarily serves to prevent water penetration.

Further, the sheet packing 112 has a belt-like projection 522 and six ditches 522G. As shown in FIG. 5, the belt-like projection 522 has approximately the same shape as the shape of the upper portion of the metal plate 110 in FIG. 5. The projecting direction of the belt-like projection 522 is opposite to the rising direction of the protruding seal part 43.

The ditches 522G are formed by cutting off a part of the belt-like projection 522 at four locations. The place where the metal plate 110 is present and a place opposite to the place with the belt-like projection 522 in between (the latter place being positioned upper in FIG. 5) communicate with each other through the ditches 522G.

The sheet packing 112 is formed of an elastic resin (e.g., silicone rubber, polyethylene elastomer resin or the like). It is preferable that the protruding seal part 43 should be formed of a resin having at least a certain degree of elastic deformability, more preferably, silicone rubber.

As shown in FIG. 5, as the metal plate 110 is placed at the opening 529 of the sheet packing 112, the waterproof member 4 is formed.

In this case, insert molding is one of the optimal measures to connect the sheet packing 112 and the metal plate 110 together. Insert molding is a scheme of inserting a metal material or the like in a mold having a predetermined shape and then injecting a resin therein to acquire an article having the metal material and the resin material integrated. Regarding the embodiment, the metal plate 110 formed to have the shape shown in FIG. 5 is prepared in advance as the metal material, and the mold is shaped to substantially match with the shape of the sheet packing 112 as shown in FIG. 5. The layout relationship of the engagement walls 111 in the mold is set adequately. As a result, the engagement walls 111 are connected to the sheet packing 112 to connect the metal plate 110 to the sheet packing 112 as shown in FIG. 6.

A description will now be given of the mode or the like of mounting the waterproof member 4 to, for example, a cellular phone.

First, the waterproof member 4 is placed over the inner surface of the second casing 2 of the cellular phone which has an electric circuit board or the like already mounted therein. The protruding seal part 43 is placed over the recess 23 of the second casing 2, and is pressed into the recess 23 by a finger (see FIG. 6). As a result, the projection 441 provided at the side surface of the protruding seal part 43 enter the dent 231 provided at a side wall of the recess 23, so that the projection 441 engages with the dent 231. This makes it difficult for the protruding seal part 43 to come out of the recess 23. Subsequently, the first casing 1 is placed over the waterproof member 4. Then, a sealing projection 136 provided at that position of the first casing 1 which abuts on the circumferential wall part 42 is positioned above the protruding seal part 43 and the recess 23.

In this state, the first casing 1 and the second casing 2 are connected by screws. Accordingly, the sealing projection 136 further presses the protruding seal part 43 into the recess 23. Then, the sealing projection 136 prevents the protruding seal part 43 from floating off or coming out of the recess 23. Force (first force) acts on the protruding seal part 43 in the directions of arrows shown in FIG. 6.

First, force to press the protruding seal part 43 downward acts on the upper end of the protruding seal part 43 in FIG. 6. As a result, the first force is received at the bottom of the recess 23, and, as shown in FIG. 6, force to diffuse radially acts on the neighborhood of the lower end of the protruding seal part 43, which is formed of an elastic resin material as mentioned above. The radial compression of the protruding seal part 43 enhances the adhesivity between the protruding seal part 43 and the recess 23.

If the protruding seal part 43 is formed of an elastic resin material and the width of the protruding seal part 43 is substantially the same as the width of the recess 23, and the width of the recess 23 is greater than the width of the sealing projection 136, the radial compression action is demonstrated most preferably. The "width" mentioned herein means the length in the right and left direction in FIG. 6. The width of the recess 23 may be substantially identical to the width of the sealing projection 136.

The waterproof structure for casings according to the embodiment described above brings about the following advantages.

The waterproof structure for casings according to the embodiment has an extremely effective waterproof function. This is because the protruding seal part 43 and the recess 23 are in close contact with each other.

That is, the force from the sealing projection 136 acting on the protruding seal part 43 causes the lower end portion thereof to diffuse radially, so that the protruding seal part 43 receives the reaction force from the side wall of the recess 23 to enable radial compression. As the adhesivity between the protruding seal part 43 and the recess 23 is enhanced, waterproof is effectively provided.

As the protruding seal part 43 receives the reaction force for the side wall of the recess 23 enables radial compression, the As the adhesivity between the protruding seal part 43 and the recess 23 is maintained even when deformation like twisting is applied to the second casing 2. That is, according to the embodiment, even if the second casing 2 is deformed, it is very unlikely that water penetration occurs.

According to the embodiment, the work of assembling the first casing 1 is easy. This is because the waterproof member 4 generally has a plate shape and the rigidity is unlikely to change relatively significantly. Because the work of assembling the waterproof member 4 merely causes the protruding seal part 43 to be positioned in the recess 23 and presses the protruding seal part 43 in the recess 23, no particular attention need not be paid. The supremacy of the embodiment becomes more outstanding as compared with the case of an annular packing which has been conventionally popular and is relatively easily deformed.

For the same reason, the work of assembling the waterproof member 4 is easy, so that there hardly occurs a variation in the yield of cellular phones to be mass-produced and waterproofing of the casings is maintained.

Further, as the waterproof member 4 has the metal plate 110, the embodiment brings about the following advantages.

First, the presence of the metal plate 110 can allow the entire waterproof member 4 to be made thinner. The metal plate 110 provides the entire waterproof member 4 with rigidity.

As mentioned above, the presence of the metal plate 110 allows the waterproof member 4 or the first casing 1 to become thinner, thus making the entire cellular phone smaller. Further, the work of assembling the casings becomes easier.

The projection 513 or 514 formed on the metal plate 110 provides the metal plate 110 with a high strength. Accordingly, the rigidity of the entire waterproof member 4 is maintained and improved.

Secondly, the metal plate 110 has a shield function. That is, as an electric circuit board, for example, is arranged in the vicinity of the waterproof member 4 in such a way as to face the waterproof member 4, the metal plate 110 can shield noise toward the electric circuit board or noise generated therefrom.

Therefore, the cellular phone according to the embodiment is not affected by noise or the like, and operates more accurately. The metal plate 110 can be ground by adequate means.

Third Embodiment

Figure 7:
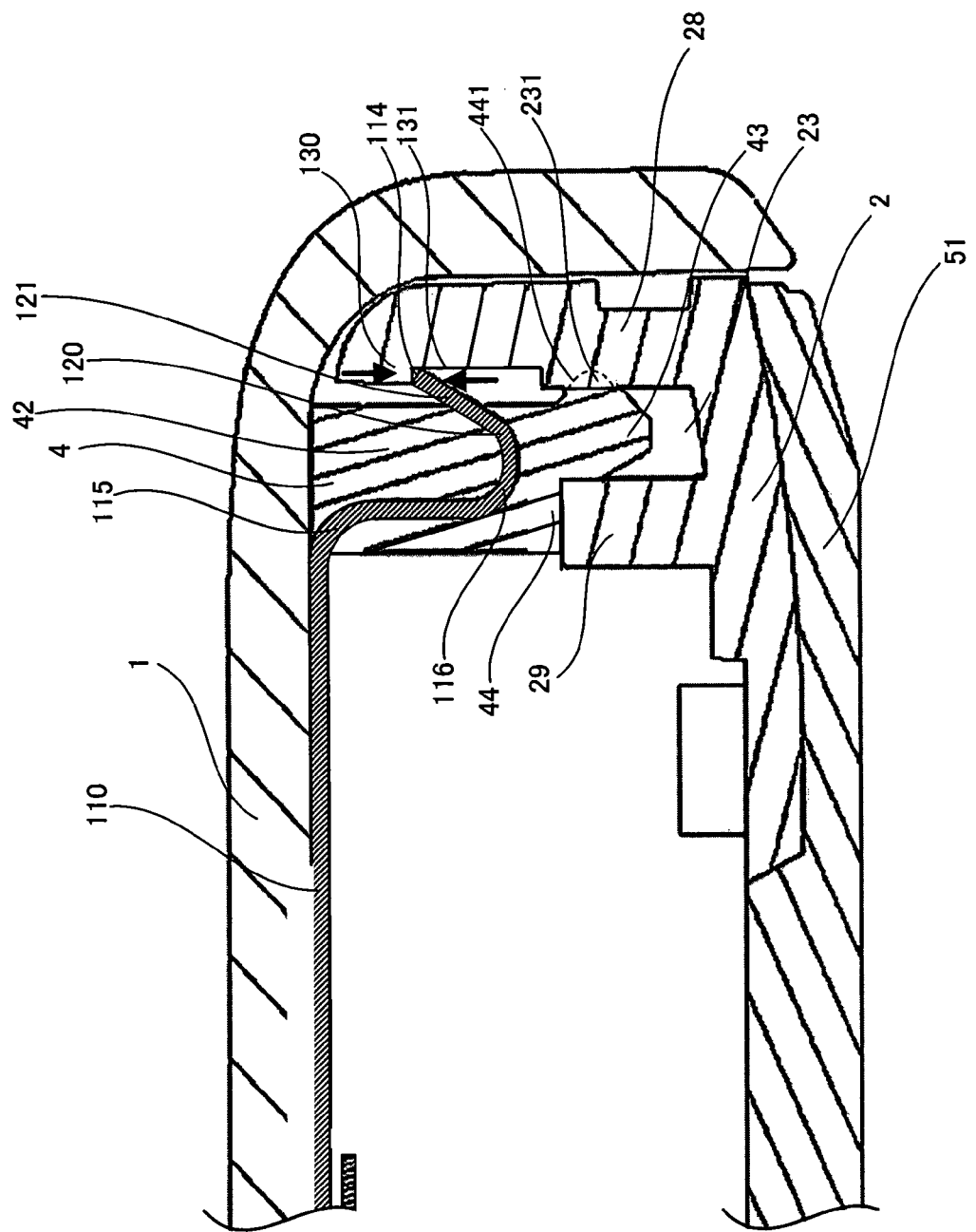
FIG. 7 is a diagram illustrating engagement of a waterproof member with a second casing in a waterproof structure according to a third embodiment of the invention.

FIG. 7 shows a section of the waterproof structure according to the third embodiment of the present invention. The waterproof structure according to the third embodiment differs from that of the first embodiment in that the waterproof member 4 has the metal plate 110. The metal plate 110 is provided at a position inward of the casings and extending from the circumferential wall part 42 approximately horizontally. The metal plate 110 is formed of stainless steel. The metal plate 110 is formed to have a thickness of 1.0 to 5.0 mm.

The metal plate 110 has a first hook 120 which is bent toward the second casing 2 at a position 115 inward of an end portion 114 of the metal plate 110 by a predetermined distance, and is bent toward the first casing 1 at a position 116 slightly outward of the inward-bent position, the first hook 120 having an end portion 121 protruding from the circumferential wall part 42.

The second casing 2 has the recess 23 formed between a first projecting part 28 located outside the casing and a second projecting part 29 located inside the casing. As shown in FIG. 7, the distal end protruding from the first projecting part 28 forms a second hook 130. As indicated by arrows in FIG. 7, the engagement of the second hook 130 with the first hook 120 prevents the protruding seal part 43 from coming out of the recess 23. In other words, the waterproof member 4 is prevented from coming out of the second casing 2.

A description will now be given of how to connect the first casing 1 and the second casing 2 in the waterproof structure according to the third embodiment. Note that those portions which are common to the way of connecting the first casing 1 and the second casing 2 in the waterproof structure according to the second embodiment will be omitted.

First, the waterproof member 4 is mounted inside the second casing 2 accommodating the interior trim 3. That is, the protruding seal part 43 is press fitted in the recess 23 of the second casing 2, and the first hook 120 protruding from the circumferential wall part 42 is engaged with the second hook 130. To engage the first hook 120 with the second hook 130, the waterproof member 4 is pressed into the second casing 2 with the end portion 121 of the first hook 120 being slightly urged inward of the casing.

Then, the first casing 1 is placed over the second casing 2 and the waterproof member 4. Then, the first casing 1 and the second casing 2 are coupled together by screws (not shown) at the four corners.

Then, an inward end portion 44 of the circumferential wall part 42 of the waterproof member 4 is supported by the second projecting part 29 of the second casing 2.

In the process of connecting the first casing 1 and the second casing 2, as described above, the work of assembling the waterproof member 4 is done merely by engagement of the first hook 120 protruding from the circumferential wall part 42 of the waterproof member 4 with the second hook 130 provided at the distal end of the first projecting part 28 of the second casing 2, and can be carried out easily.

First, as the first hook 120 is engaged with the second hook 130, it is unlikely that the waterproof member 4 comes out of the second casing 2.

The end portion 121 of the first hook 120 is urged outward of the casings by the elastic force of the metal, and the urging force of the end portion 121 outward of the casings are received by a surface 131 of the second hook 130. This makes it possible to prevent the waterproof member 4 from rocking right and left.

Unlike in the conventional waterproof structure, therefore, no repulsive force is generated between the first casing 1 and the second casing 2, thus ensuring easier fixation of the first casing 1 and the second casing 2 by fewer screws. What is more, as the waterproof member 4 is prevented from coming out, vibration or the like does not cause the waterproof member 4 to come out, thus ensuring reliable waterproofing.

Because elastic force does not act in the vertical (up and down) direction, the casings can be made thinner to provide a thinner and smaller cellular phone.

Fourth Embodiment

Figure 8:
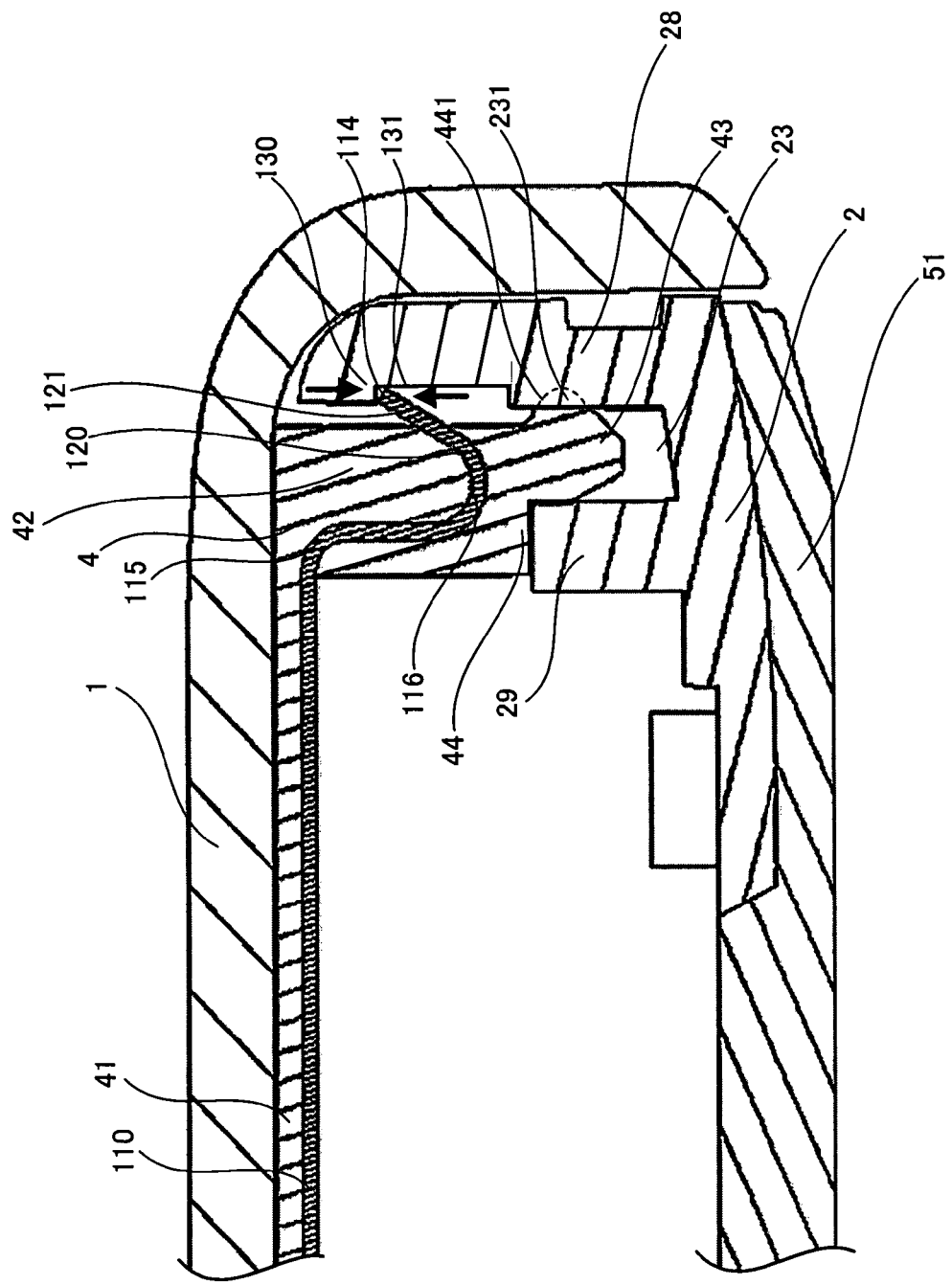
FIG. 8 is a diagram illustrating engagement of a waterproof member with a second casing in a waterproof structure according to a fourth embodiment of the invention.

In the fourth embodiment, unlike the third embodiment, the waterproof member 4 has the flat part 41 extending inward of the casings and approximately in parallel from the circumferential wall part 42, as shown in FIG. 8. The metal plate 110 is adhered to the second casing side of the flat part 41. This structure allows the waterproof member 4 be elastically adhered to the first casing 1 at the flat part 41.

Fifth Embodiment

In the fifth embodiment, unlike the third and fourth embodiments, provides the structure for relaxing the pressure influence, which makes it harder to cause deformation, cracks or the like of the casings due to the influence of the level of the internal pressure of the casings.

Figure 9:
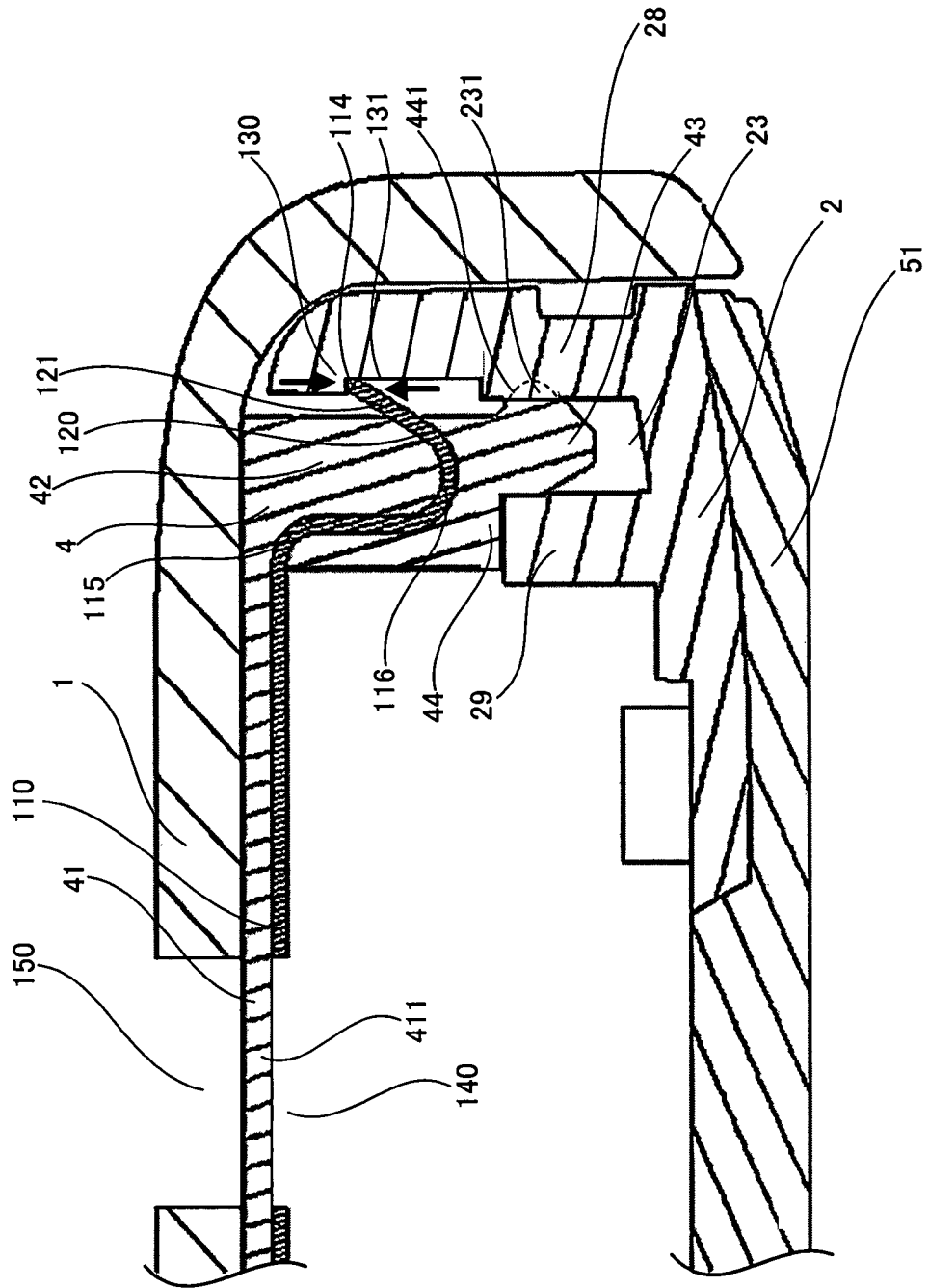
FIG. 9 is a diagram illustrating engagement of a waterproof member with a second casing in a waterproof structure according to a fifth embodiment of the invention.

As shown in FIG. 9, the structure for relaxing the pressure influence has a first opening 140 provided in the center portion of the metal plate 110, a second opening 150 provided in the first casing 1, and an exposed portion 411 of the flat part 41 which is positioned between the first opening 140 and the second opening 150 and exposed to the outside air. The second opening 150 holds the waterproof member 4, and is provided at a position facing the first opening 140. The first opening 140 has an opening having a circular cross section. The second opening 150 likewise has an opening having a circular cross section of the same diameter as that of the first opening 140. The circular cross-sectional opening can make it harder to cause cracks starting from the opening.

A portable electronic device, such as a cellular phone, can be carried about at positions under various environments, such as a very cold place and a very hot place. In such a case, as the internal pressure of the casings rises or falls, force is applied to the internal structure of the casings, which may result in deformation, cracks or the like of the casings. If cracks or the like are formed in the casings, external water penetrates there, impairing the waterproof structure.

If the structure for relaxing the pressure influence is provided, however, when the outside temperature is high, for example, the exposed portion 411 of the flat part 41 positioned between the first opening 140 and the second opening 150 expands outward of the casings. This prevents the internal pressure of the casings from rising. This makes it harder to cause cracks or the like in the casings. It is therefore possible to keep waterproofing of the casings.

Sixth Embodiment

Figure 10:
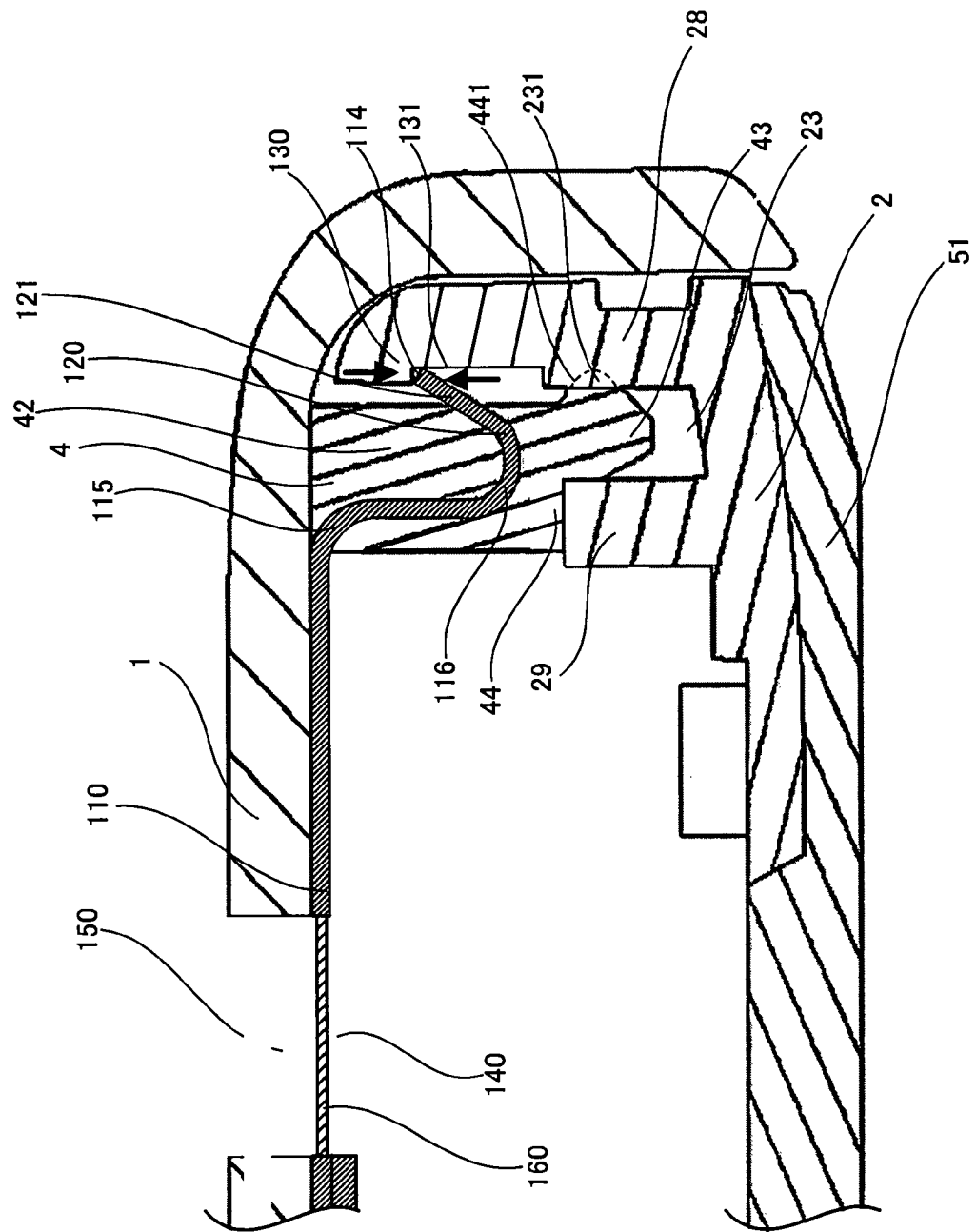
FIG. 10 is a diagram illustrating engagement of a waterproof member with a second casing in a waterproof structure according to a sixth embodiment of the invention.

The sixth embodiment is also provided with the pressure influence relaxing structure, which differs from that of the fifth embodiment. As shown in FIG. 10, the pressure influence relaxing structure of the sixth embodiment the a first opening 140 provided in the center portion of the metal plate 110, the second opening 150 provided in the first casing 1 at a position overlying the first opening 140, and a seal 160 of an elastic material fitted in the first opening 140. As the material for the seal 160, polybutadiene, polyacrylonitrile or the like can be used. The seal 160 is fitted in the first opening 140 without a gap so that water does not penetrate through the second opening 150.

The flat part 41 is not provided at the waterproof member 4. As shown in FIG. 10, the waterproof member 4 comprises the metal plate 110 having the first hook 120, the circumferential wall part 42 and the protruding seal part 43, which are provided at the end portion of the metal plate 110. With no flat part 41 provided, the waterproof member 4 can be formed easily.

When the outside temperature is high, for example, the seal 160 expands outward of the casings, thereby preventing the internal pressure of the casing from rising in the sixth embodiment. This makes it harder to cause cracks or the like in the casings.

Although the waterproof structures of the above-described embodiments are adapted to cellular phones, the present invention is not limited to such a target. Application targets may be electronic devices, such as a clock, a watch, a camera, a PDA, and a wearable personal computer.

The shapes or the like of the casings and the waterproof member are optional, and the specific detailed structures or the like can be changed as needed. For example, a part of the waterproof member 4 which corresponds to a display device, such as an LCD panel or LED, may be transparent. Further, the first casing 1 may be transparent, and the electromagnetic shield (silver sheet or metal plate) 8 can be provided inward of the waterproof member 4 as in the embodiments.

When the waterproof member is formed of transparent rubber as done in the embodiments, the light guide plate may not be inserted. When the character size of the display device is large or the amount of light from the backlight is sufficient, and when an LED or the like is further used, for example, the light guide plate is unnecessary.

In the second embodiment, the waterproof member 4 is a film configured to have the protruding seal part 43, the circumferential wall part 42 and the flat part 41. The waterproof member 4 can however be an approximately ring-like member which does not have the flat part 41.

In the embodiments, each of the first opening 140 and the second opening 150 has a circular cross section. However, the first opening 140 and the second opening 150 are not limited to this type. The first opening 140 and the second opening 150 may have elliptic cross sections, or may have polygonal cross sections, such as a triangle, square, rectangle, pentagon and hexagon.

In the embodiments, the first opening 140 is provided at the center portion of the metal plate 110, and the second opening 150 is provided at the center portion of the first casing 1. The first opening 140 and the second opening 150 are not limited to those types. The first opening 140 may be provided at a location other than the center portion of the metal plate 110, e.g., at an end portion of the metal plate 110. The second opening 150 may be provided at a location other than the center portion of the first casing 1, e.g., at an end portion of the first casing 1.

This application is based on Japanese Patent Application No. 2006-264736 filed on Sep. 28, 2006, Japanese Patent Application No. 2007-134816 filed on May 21, 2007, and Japanese Patent Application No. 2007-188606 filed on Jul. 19, 2007, and including specification, claims, drawings and summary. The disclosures of the above Japanese Patent Applications are incorporated herein by reference in their entireties.

What is claimed is:

1. A waterproof structure for a casing of a portable device, the waterproof structure comprising:
   a first casing;
   a second casing to be put together with the first casing, the second casing having a recess; and a waterproof member formed of an elastic material to prevent water from penetrating between the first casing and the second casing, wherein the waterproof member comprises a peripheral part laid out all around a space between the first casing and the second casing, when the peripheral part is brought into contact with the recess, the peripheral part being press fitted in the recess in a horizontal direction without exerting an elastic force to the second casing in a vertical direction;

wherein the first casing comprises a restriction part configured to prevent the peripheral part from coming out of the recess, the restriction part being located at a position opposite to the peripheral part, after the peripheral part is pressed fitted in the recess of the waterproof member;

wherein the waterproof member comprises a circumferential wall part and a metal plate, the circumferential wall part bending inwardly from the peripheral part and standing upright toward the first casing, the metal plate being formed integrally in the waterproof member and bent inside the waterproof member from a flat part of the waterproof member in a direction toward the second casing, the flat part placed between the first casing and the second casing; and wherein the circumferential wall part is guided by the first casing and the second casing.

2. The waterproof structure according to claim 1, wherein the waterproof member is a film covering between the first casing and the second casing.

3. The waterproof structure according to claim 1, wherein the second casing is provided with a support which supports an end face of the circumferential wall part of the waterproof member.

4. The waterproof structure according to claim 2, wherein a part of the waterproof member is transparent, and a mount part where a light guide plate is mounted is provided at the transparent part.

5. The waterproof structure according to claim 2, further comprising an electromagnetic shield integrally formed on an internal side of the waterproof member.

6. The waterproof structure according to claim 1, wherein the metal plate has a protruding part at a part of a flat surface of the metal plate.

7. A waterproof structure for a casing of a portable device, the structure comprising:

a first casing;

a second casing to be put together with the first casing, the second casing having a recess with a dent in which a projection is insertable; and a waterproof member formed of an elastic material to prevent water from penetrating between the first casing and the second casing, the waterproof member having a protruding seal part which, when fitted into the recess, prevents penetration of water and has a projection engageable with the dent when being inserted in the dent;

wherein the waterproof member has a circumferential wall part standing upright toward the first casing from the protruding seal part, and partially has a metal plate provided at a position extending approximately horizontally from the circumferential wall part, wherein the metal plate has a first hook which is bent toward the second casing at a position inward of an end portion of the metal plate by a predetermined distance, and is bent toward the first casing at a position slightly outward of the inward-bent position, the first hook having an end portion protruding from the circumferential wall part; and wherein the second casing has a second hook engageable with the first hook.

8. The waterproof structure according to claim 7, wherein the waterproof member has a flat part extending approximately horizontally from the circumferential wall part, and the metal plate is adhered to a second casing side of the flat part.

9. The waterproof structure according to claim 8, wherein the metal plate is provided with a first opening, and the first casing is provided with a second opening at a position facing the first opening with the waterproof member in between.

10. The waterproof structure according to claim 7, wherein the metal plate is provided with a first opening in which a seal formed of an elastic material is fitted, and the first casing is provided with a second opening which exposes the seal.

11. The waterproof structure according to claim 9, wherein the first opening and the second opening are circular or elliptic.

12. The waterproof structure according to claim 5, wherein the electromagnetic shield is a silver sheet formed on the internal side of the waterproof member.

13. The waterproof structure according to claim 1, wherein the circumferential wall of the waterproof member is located outside the recess in the second casing.

14. The waterproof structure according to claim 1, wherein the flat part of the waterproof member is located outside the recess in the second casing.

15. The waterproof structure according to claim 1, wherein the flat part of the waterproof member overlaps substantially an entire inside surface of the first casing.

* * * * *